US 8,873,260 B2

(12) United States Patent
Voyer

(10) Patent No.: US 8,873,260 B2
(45) Date of Patent: Oct. 28, 2014

(54) METHOD AND AN APPARATUS FOR CONTROLLING THE OUTPUT VOLTAGE OF A BOOST CONVERTER

(75) Inventor: Nicolas Voyer, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 437 days.

(21) Appl. No.: 13/265,733

(22) PCT Filed: Apr. 22, 2010

(86) PCT No.: PCT/EP2010/055312
§ 371 (c)(1),
(2), (4) Date: Oct. 21, 2011

(87) PCT Pub. No.: WO2010/122084
PCT Pub. Date: Oct. 28, 2010

(65) Prior Publication Data
US 2012/0044726 A1 Feb. 23, 2012

(30) Foreign Application Priority Data
Apr. 23, 2009 (EP) .................................... 09158617

(51) Int. Cl.
*H02M 3/07* (2006.01)
(52) U.S. Cl.
CPC ...................................... *H02M 3/07* (2013.01)
USPC ................................ 363/60; 363/68; 323/271
(58) Field of Classification Search
USPC ............ 323/268, 271, 282; 363/59, 60, 65, 68
See application file for complete search history.

(56) References Cited

U.S. PATENT DOCUMENTS

| 5,481,447 A * | 1/1996 | Caris et al. ....................... 363/60 |
| 5,642,275 A * | 6/1997 | Peng et al. ....................... 363/137 |
| 6,055,168 A * | 4/2000 | Kotowski et al. ................ 363/60 |
| 6,169,673 B1 * | 1/2001 | McIntyre et al. ................ 363/59 |
| 6,563,235 B1 * | 5/2003 | McIntyre et al. .............. 307/109 |
| 7,456,677 B1 * | 11/2008 | Rao et al. ........................ 327/536 |
| 8,089,787 B2 * | 1/2012 | Melse .............................. 363/62 |
| 2009/0278520 A1 * | 11/2009 | Perreault et al. .............. 323/282 |

OTHER PUBLICATIONS

Zhong D. et al, "A Cascade Multilevel Inverter Using a Single DC Source", IEEE, pp. 426-430, XP002549964, (Mar. 23, 2006).

(Continued)

*Primary Examiner* — Fred E Finch, III
(74) *Attorney, Agent, or Firm* — Oblon, Spivak, McClelland, Maier & Neustadt, L.L.P.

(57) ABSTRACT

The present invention concerns a method for controlling an output voltage of a boost converter composed of n bridge devices connected in series, each bridge device being composed of plural switches and a capacitor, the switches being controlled by periodical patterns decomposed in time intervals. In each time interval of a first and at least one second periodical patterns, the voltage between the input and the output of each ith bridge device with i from one to n, is equal to a null value, or an integer number $k_i$ times a first and at least on second positive value, or minus the number $k_i$ times the first and at least one second positive value, and in each time interval of at least one third periodical pattern, the voltage between the input and the output of each ith bridge device with i from one to n, being equal to a null value, or an integer number $p_i$ times and at least one third positive value, or minus the number $p_i$ times the at least one third positive value, at least one number $k_i$ being different from the number $p_i$.

15 Claims, 9 Drawing Sheets

(56) References Cited

OTHER PUBLICATIONS

Abutbul O. et al, "Step-Up Switching-Mode Converter With High Voltage Gain Using a Switched-Capacitor Circuit", IEEE, vol. 50, No. 8, pp. 1096-1102, XP011099419, (Aug. 1, 2003).

International Search Report issued Oct. 25, 2010 in PCT/EP2010/055312 Filed Apr. 22, 2010.

U.S. Appl. No. 13/259,911, filed Oct. 21, 2011, Buiatti, et al.

U.S. Appl. No. 13/265,080, filed Oct. 18, 2011, Buiatti, et al.

* cited by examiner

| Vin | Vout | ratio | D | (N,P) | $V_{ref}$ | Fig |
|---|---|---|---|---|---|---|
| 24 | 240 | 10 | 0.9 | (10,9) | 24 | 5a |
| 30 | 240 | 8 | 0.875 | (8,7) | 30 | 6d |
| 34.3 | 240 | 7 | 0.857 | (7,6) | 34.3 | 7b |
| 40 | 240 | 6 | 0.833 | (6,5) | 40 | 8a |
| 48 | 240 | 5 | 0.8 | (5,4) | 48 | 9a |
| 90 | 240 | 2.67 | 0.625 | (8,5) | 30 | 6b |
| 96 | 240 | 2.5 | 0.6 | (5,3) | 48 | 9b |
| 144 | 240 | 1.67 | 0.4 | (5,2) | 48 | 9c |
| 150 | 240 | 1.6 | 0.375 | (8,3) | 30 | 6c |
| 192 | 240 | 1.25 | 0.2 | (5,1) | 48 | 9d |
| 200 | 240 | 1.2 | 0.166 | (6,1) | 40 | 8b |
| 205.7 | 240 | 1.16 | 0.142 | (7,1) | 34.3 | 7a |
| 210 | 240 | 1.14 | 0.125 | (8,1) | 30 | 6a |
| 216 | 240 | 1.11 | 0.1 | (10,1) | 24 | 5b |

| $V_{in}$ | $V_{out}$ | ratio | D | (N,P) | $V_{ref}$ | Fig |
|---|---|---|---|---|---|---|
| 60 | 240 | 4 | 0.75 | (8,6) | 30 | 10a |
| 48 | 240 | 5 | 0.8 | (5,4) | 48 | 10b |

Fig. 3b

| B1 | | | B2 | | | B3 | | |
|---|---|---|---|---|---|---|---|---|
| Vb1 | S11 | S12 | Vb2 | S21 | S22 | Vb3 | S31 | S32 |
| Vc1 | OFF | OFF | Vc2 | OFF | OFF | Vc3 | OFF | OFF |
| 0 | OFF | ON | 0 | OFF | ON | 0 | OFF / ON | ON / OFF |
| -Vc1 | ON | ON | -Vc2 | ON | ON | -Vc3 | ON | ON |

Fig. 4a

| B1 | | | B2 | | | B3 | | |
|---|---|---|---|---|---|---|---|---|
| Vb1 | S11 | S12 | Vb2 | S21 | S22 | Vb3 | S31 | S32' |
| Vc1 | OFF | OFF | Vc2 | OFF | OFF | Vc3 | OFF | ON |
| 0 | OFF | ON | 0 | OFF | ON | 0 | ON / OFF | ON / OFF |
| -Vc1 | ON | ON | -Vc2 | ON | ON | -Vc3 | ON | OFF |

Fig. 4b

| P=9 N=10 D=0.9 $V_{ref}$ = Vout/10 | Time interval ||||||||||
|---|---|---|---|---|---|---|---|---|---|---|
| | T1 | T2 | T3 | T4 | T5 | T6 | T7 | T8 | T9 | T10 |
| $Vc1= 2V_{ref}$ | -1 | -1 | 0 | 0 | 0 | 0 | 1 | 1 | 1 | -1 |
| $Vc2=3V_{ref}$ | 1 | 1 | -1 | -1 | -1 | -1 | 1 | 1 | 1 | -1 |
| $Vc3= 4V_{ref}$ | 0 | 0 | 1 | 1 | 1 | 1 | -1 | -1 | -1 | -1 |

Fig. 5a

| P=1 N=10 D=0.1 $V_{ref}$ = Vout/10 | Time interval ||||||||||
|---|---|---|---|---|---|---|---|---|---|---|
| | T1 | T2 | T3 | T4 | T5 | T6 | T7 | T8 | T9 | T10 |
| $Vc1= 2V_{ref}$ | 1 | 1 | 1 | 0 | 0 | 0 | 0 | -1 | -1 | -1 |
| $Vc2=3V_{ref}$ | 1 | -1 | -1 | 1 | 1 | 1 | 1 | -1 | -1 | -1 |
| $Vc3= 4V_{ref}$ | 1 | 0 | 0 | -1 | -1 | -1 | -1 | 1 | 1 | 1 |

Fig. 5b

| P=1 N=8 D=0.125 Vref = Vout/8 | Time interval ||||||||
|---|---|---|---|---|---|---|---|---|
| | T1 | T2 | T3 | T4 | T5 | T6 | T7 | T8 |
| Vc1= 2Vref | 0 | 1 | 1 | 0 | 0 | 0 | -1 | -1 |
| Vc2=3Vref | 1 | -1 | -1 | 1 | 1 | 1 | -1 | -1 |
| Vc3= 4Vref | 1 | 0 | 0 | -1 | -1 | -1 | 1 | 1 |

Fig. 6a

| P=5 N=8<br>D=0.625<br>Vref = Vout/8 | Time interval | | | | | | | |
|---|---|---|---|---|---|---|---|---|
| | T1 | T2 | T3 | T4 | T5 | T6 | T7 | T8 |
| Vc1= 2Vref | 1 | 0 | 0 | 0 | 0 | -1 | -1 | 1 |
| Vc2=3Vref | -1 | 1 | 1 | 1 | 1 | -1 | -1 | -1 |
| Vc3= 4Vref | 1 | 0 | 0 | 0 | 0 | 0 | 0 | -1 |

| P=3 N=8<br>D=0.375<br>Vref = Vout/8 | Time interval | | | | | | | |
|---|---|---|---|---|---|---|---|---|
| | T1 | T2 | T3 | T4 | T5 | T6 | T7 | T8 |
| Vc1= 2Vref | -1 | 1 | 1 | -1 | 0 | 0 | 0 | 0 |
| Vc2=3Vref | 1 | 1 | 1 | 1 | -1 | -1 | -1 | -1 |
| Vc3= 4Vref | 1 | 0 | 0 | -1 | 0 | 0 | 0 | 0 |

| P=7 N=8<br>D=0.875<br>Vref = Vout/8 | Time interval | | | | | | | |
|---|---|---|---|---|---|---|---|---|
| | T1 | T2 | T3 | T4 | T5 | T6 | T7 | T8 |
| Vc1= 2Vref | -1 | -1 | 0 | 0 | 0 | 1 | 1 | 0 |
| Vc2=3Vref | 1 | 1 | -1 | -1 | -1 | 1 | 1 | -1 |
| Vc3= 4Vref | 0 | 0 | 1 | 1 | 1 | -1 | -1 | -1 |

| P=1 N=7 D=0.857 Vref = Vout/7 | Time interval | | | | | | |
|---|---|---|---|---|---|---|---|
| | T1 | T2 | T3 | T4 | T5 | T6 | T7 |
| Vc1= 2V$_{ref}$ | 1 | 0 | 0 | 0 | 1 | -1 | -1 |
| Vc2=3V$_{ref}$ | 0 | 1 | 1 | 1 | -1 | -1 | -1 |
| Vc3= 4V$_{ref}$ | 1 | -1 | -1 | -1 | 0 | 1 | 1 |

| P=6 N=7 D=0.142 Vref = Vout/7 | Time interval | | | | | | |
|---|---|---|---|---|---|---|---|
| | T1 | T2 | T3 | T4 | T5 | T6 | T7 |
| Vc1= 2Vref | 1 | 1 | 0 | 0 | 0 | -1 | -1 |
| Vc2=3Vref | 1 | 1 | -1 | -1 | -1 | 1 | 0 |
| Vc3= 4Vref | -1 | -1 | 1 | 1 | 1 | 0 | -1 |

| P=5 N=6 D=0.833 V$_{ref}$ = Vout/6 | Time interval | | | | | |
|---|---|---|---|---|---|---|
| | T1 | T2 | T3 | T4 | T5 | T6 |
| Vc1= 2V$_{ref}$ | 1 | 0 | 0 | -1 | -1 | 1 |
| Vc2=3V$_{ref}$ | 1 | -1 | -1 | 1 | 1 | -1 |
| Vc3= 4V$_{ref}$ | -1 | 1 | 1 | 0 | 0 | -1 |

| P=1 N=6<br>D=0.166<br>$V_{ref}$ = Vout/6 | Time interval | | | | | |
|---|---|---|---|---|---|---|
| | T1 | T2 | T3 | T4 | T5 | T6 |
| $Vc1 = 2V_{ref}$ | -1 | -1 | 0 | 0 | 1 | 1 |
| $Vc2 = 3V_{ref}$ | 1 | -1 | 1 | 1 | -1 | -1 |
| $Vc3 = 4V_{ref}$ | 1 | 1 | -1 | -1 | 0 | 0 |

| P=4 N=5<br>D=0.8<br>$V_{ref}$ = Vout/5 | Time interval | | | | |
|---|---|---|---|---|---|
| | T1 | T2 | T3 | T4 | T5 |
| $Vc1 = 2V_{ref}$ | 1 | 0 | 0 | -1 | 0 |
| $Vc2 = 3V_{ref}$ | 1 | -1 | -1 | 1 | 0 |
| $Vc3 = 4V_{ref}$ | -1 | 1 | 1 | 0 | -1 |

| P=3 N=5<br>D=0.6<br>$V_{ref}$ = Vout/5 | Time interval | | | | |
|---|---|---|---|---|---|
| | T1 | T2 | T3 | T4 | T5 |
| $Vc1 = 2V_{ref}$ | -1 | 1 | 1 | 0 | -1 |
| $Vc2 = 3V_{ref}$ | 0 | 0 | 0 | -1 | 1 |
| $Vc3 = 4V_{ref}$ | 1 | 0 | 0 | 0 | -1 |

| P=2 N=5<br>D=0.4<br>$V_{ref}$ = Vout/5 | Time interval | | | | |
|---|---|---|---|---|---|
| | T1 | T2 | T3 | T4 | T5 |
| $Vc1 = 2V_{ref}$ | 1 | 0 | 1 | -1 | -1 |
| $Vc2 = 3V_{ref}$ | -1 | 1 | 0 | 0 | 0 |
| $Vc3 = 4V_{ref}$ | 1 | 0 | -1 | 0 | 0 |

Fig. 9c

| P=1 N=5<br>D=0.2<br>$V_{ref}$ = Vout/5 | Time interval | | | | |
|---|---|---|---|---|---|
| | T1 | T2 | T3 | T4 | T5 |
| $Vc1 = 2V_{ref}$ | 0 | -1 | 0 | 0 | 1 |
| $Vc2 = 3V_{ref}$ | 0 | -1 | 1 | 1 | -1 |
| $Vc3 = 4V_{ref}$ | 1 | 1 | -1 | -1 | 0 |

Fig. 9d

| P=6 N=8<br>D=0.75<br>$V_{ref}$ = Vout/8 | Time interval | | | | | | | |
|---|---|---|---|---|---|---|---|---|
| | T1 | T2 | T3 | T4 | T5 | T6 | T7 | T8 |
| $Vc1 = V_{ref}$ | 0 | 0 | 0 | 0 | 0 | 0 | 0 | 0 |
| $Vc2 = 2V_{ref}$ | 1 | 1 | 1 | 1 | -1 | -1 | -1 | -1 |
| $Vc3 = 4V_{ref}$ | 0 | 0 | 0 | 0 | 1 | 1 | -1 | -1 |

Fig. 10a

| P=4 N=5 D=0.8 $V_{ref}$ = Vout/5 | Time interval ||||| |
|---|---|---|---|---|---|
| | T1 | T2 | T3 | T4 | T5 |
| Vc1= $V_{ref}$ | -1 | -1 | 1 | 1 | 0 |
| Vc2=2$V_{ref}$ | -1 | 1 | 0 | 0 | 0 |
| Vc3= 4$V_{ref}$ | 1 | 0 | 0 | 0 | -1 |

METHOD AND AN APPARATUS FOR CONTROLLING THE OUTPUT VOLTAGE OF A BOOST CONVERTER

The present invention relates generally to a method and an apparatus for controlling the output voltage of a boost converter.

Classical DC/DC converters use inductors in order to convert a direct current from a first voltage to a second voltage which may be larger or smaller than the first voltage.

Inductors are used for storing energy in the form of magnetic field (current) and they have many drawbacks. Inductors are heavy, their cost is relatively important because they are mainly composed of copper material.

The combination of switches and capacitors in order to replace inductors has been already proposed.

For example, charge pumps, also known as DC/DC converters or boost converters composed of plural bridge devices use capacitors as energy storage elements. When compared to inductive switching DC/DC converters, which also use inductors as energy storage elements, charge pumps offer unique characteristics that make them attractive for certain end-user applications.

Boost converters when operating in Continuous Current Mode (CCM) increase the voltage of the input by a ratio $r=V_{out}/V_{in}=1/(1-D)$, where D is the duty cycle (between 0 and 1) of the main switch of the boost converter.

The main difference between conventional Boost converters and the boost converters composed of plural bridge devices relies on the fact that the latter can only achieve some discrete values of voltage step-up ratio.

For example, in photovoltaic applications, large input voltage variations can be unacceptable for boost converters composed of plural bridge devices as the power provided by the solar module can not be maintained to the maximum power value corresponding to an optimum input voltage level.

The present invention aims to provide a boost converter composed of plural bridge devices which can work with an important number of voltage step-up ratios.

To that end, the present invention concerns a method for controlling an output voltage of a boost converter composed of n bridge devices connected in series, each bridge device being composed of plural switches and a capacitor, the switches being controlled by one first periodical pattern out of at least three periodical patterns, each periodical pattern being decomposed in time intervals, characterised in that in each time interval of the first and at least one second periodical patterns, the voltage between the input and the output of each ith bridge device with i from one to n, is equal to a null value, or an integer number $k_i$ times a first and at least on second positive value, or minus the number $k_i$ times the first and at least one second positive value, and in each time interval of at least one third periodical pattern, the voltage between the input and the output of each ith bridge device with i from one to n, is equal to a null value, or an integer number $p_i$ times a at least one third positive value, or minus the number $p_i$ times the at least one third positive value, at least one number $k_i$ being different from the number $p_i$ wherein the method comprises the steps of:
  detecting that a periodical pattern has to be selected,
  selecting one periodical pattern,
  controlling the switches according to the selected periodical pattern.

The present invention concerns also an apparatus for controlling an output voltage of a boost converter composed of n bridge devices connected in series, each bridge device being composed of plural switches and a capacitor, the switches being controlled by one first periodical pattern out of at least three periodical patterns, each periodical pattern being decomposed in time intervals, characterised in that in each time interval of the first and at least one second periodical patterns, the voltage between the input and the output of each ith bridge device with i from one to n, is equal to a null value, or an integer number $k_i$ times a first and at least on second positive value, or minus the number $k_i$ times the first and at least one second positive value, and in each time interval of at least one third periodical pattern, the voltage between the input and the output of each ith bridge device with i from one to n, is equal to a null value, or an integer number $p_i$ times a at least one third positive value, or minus the number $p_i$ times the at least one third positive value, at least one number $k_i$ being different from the number $p_i$ wherein the apparatus for controlling an output voltage comprises:
  means for detecting that a periodical pattern has to be selected,
  means for selecting one periodical pattern,
  means for controlling the switches according to the selected periodical pattern.

Thus, the boost converter composed of n bridge devices can adapt its input and output power levels to a flexible number of input and output voltage levels.

Moreover, many conversion boost ratios can be realised.

According to a particular feature, the detection that a periodical pattern has to be selected is executed by checking if the first periodical pattern provides an output voltage value which is lower than a first threshold or higher than a second threshold.

Thus, the output voltage of the boost converter composed of n bridge devices can be kept in a desired range of output voltage values, and the range of output voltage values can be adapted easily to the demand of a load terminal consuming the power delivered by the boost converter composed of n bridge devices.

According to a particular feature, the selected periodical pattern is one third periodical pattern if said third periodical pattern provides an output voltage value higher than the first threshold and lower than the second threshold and closer to an expected output voltage value than the output voltage provided by the or each second periodical pattern providing an output voltage higher than the first threshold and lower than the second threshold.

Thus, output voltage of boost converter composed of n bridge devices can be kept in range, even if no periodical pattern having the same $k_i$ values as that of the first pattern can provide a voltage in range, by using the third periodical pattern.

Furthermore, if one periodical pattern having the same $k_i$ values as that of the first pattern can provide a voltage in range, but at higher distance to the expected voltage value, a voltage value in range and closer to the expected value can be provided with a third periodical pattern.

According to a particular feature, the selected periodical pattern is one second periodical pattern if said second periodical pattern provides an output voltage value higher than the first threshold, lower than the second threshold and at least as close to an expected output voltage value as the voltage or voltages provided by the at least one third periodical pattern.

Thus, the output voltage of boost converter composed of n bridge devices can be kept in range without having to use a periodical pattern having at least one $p_i$ value different from the $k_i$ value. Less charging/discharging of bridge capacitors will be needed to converge to voltages provided by the third periodical pattern. The transition between periodical patterns will be executed in reduced time than if one third periodical pattern would have been selected.

According to a particular feature, the expected voltage value equals the second threshold.

Thus, maximum output voltage can be realised while in range, optimising the efficiency of a load terminal consuming the power delivered by the boost converter composed of n bridge devices.

According to a particular feature, the sum of the voltages between the input and the output of one bridge device over the number of time intervals of each periodical pattern equals a null value.

Thus, over one periodical pattern, the current delivered by a constant current source, such as a photovoltaic module, equally charges and discharges the capacitors of the bridge devices over each periodical pattern, and the voltage of capacitors is stable and does not discharge assuming a constant current source.

According to a particular feature, a first bridge device is connected to one of the terminals of an electric power source boosted by the boost converter composed of n bridge devices and one of the switches of the last bridge device is connected to the other terminal of the electric power source boosted by the boost converter composed of n bridge devices or the first bridge device is connected to one of the terminals of an electric power source boosted by the boost converter composed of n bridge devices and the boost converter composed of n bridge devices further comprises at least a switch which is connected to the last bridge device and to the other terminal of the electric power source boosted by the boost converter composed of n bridge devices.

Thus, the switch connected to the other terminal of the electric power source boosted by the boost converter composed of n bridge devices acts as the switch of a conventional boost converter. When the switch is closed, the boost converter composed of n bridge devices accumulates charges in its capacitors, which are then discharged to the output terminal when the switch is opened.

According to a particular feature, for any time interval in a first subset of time intervals of the periodical pattern, the switch which is connected to the other terminal of the electric power source boosted by the boost converter composed of n bridge devices is conducting during the time intervals of the first subset and the sum of the voltages between the input and the output of the bridge devices during the time intervals of the first subset equals an integer number Kp times the first positive value.

Thus, the input voltage can take the value of the output voltage multiplied by Kp and divided by the number N of time intervals of the selected periodical pattern when the main switch is conducting.

According to a particular feature, for any time interval in a second subset of time intervals of one periodical pattern, the switch which is connected to the other terminal of the electric power source boosted by the boost converter composed of n bridge devices is not conducting during the time intervals of the second subset and the sum of the voltages between the input and the output of the bridge devices during the time intervals of the second subset equals minus a non null integer number P times the first positive value.

Thus, the input voltage can take the value of the output voltage multiplied by (N−P) and divided by the number N of time intervals of the selected periodical pattern when the main switch is not conducting.

According to a particular feature, the first subset of time intervals comprises Kp time intervals, the second subset comprises P time intervals and the number Kp equals the number of time intervals of the periodical pattern minus number P.

Thus, the input voltage can take the value of the output voltage multiplied by N−P and divided by N at all time intervals of the periodical pattern, and the boost converter composed of n bridge devices can perform a boost ratio equal to N divided by N−P, where N and P can flexibly be chosen so as to realise the desired boost ratio.

As a result, the number of boost ratios which can be achieved with the boost converter composed of n bridge devices is increased a lot. It is then easier to achieve the regulation of the output voltage as the number of boost ratios is increased.

According to a particular feature, the input of boost converter composed of n bridge devices input is connected to an input voltage source and the voltage provided by a periodical pattern equals the voltage of the input voltage source times N divided by N minus P.

Thus, it is very simple to determine the voltage provided by each periodical pattern, and the step of selecting a periodical pattern is simplified.

According to a particular feature, each first, second and third positive values equals the input voltage value divided by the number N minus the number P of respectively each first, second and third periodical pattern.

Thus, the positive value can easily be determined from the input voltage level.

According to a particular feature, the input of boost converter composed of n bridge devices is connected to an input photovoltaic source and the voltage provided by a periodical pattern equals the voltage of the maximum power point of the photovoltaic source times N divided by N minus P.

Thus, it is very simple to determine the voltage provided by each periodical pattern, and the step of selecting a periodical pattern is simplified.

According to a particular feature, the boost converter is composed of three bridge devices, and $k_1$ equals two, $k_2$ equals three and $k_3$ equals four, $p_1$ equals one, $p_2$ equals two, $p_3$ equals four.

Thus, the first periodical pattern can be designed in such a way that the sum of the voltages between the input and the output of the bridge devices during each time interval can be arranged to be any integer number comprised between nine and minus nine times of the first positive value.

Furthermore, it is possible to benefit from very high and very low boost ratios 10:1 and 10:9 of the first periodical pattern, as well as the boost ratios of numerous third periodical patterns. The applicability range of boost converter composed of three bridge devices is extended.

According to a particular feature, the number of time intervals is an integer number comprised between five to ten.

Thus, the boost converter composed of three bridge devices can perform boost ratios which are equal to 10/1 and 10/9. The number of boost ratios which can be achieved with boost converter is raised by two. The range of boost ratio is extended from [0.875 8] to [0.9 10].

The characteristics of the invention will emerge more clearly from a reading of the following description of an example embodiment, the said description being produced with reference to the accompanying drawings, among which:

FIG. 3b represents a table representing the different step-up ratios that can be provided by the at least one third periodical pattern according to the present invention when $p_1$ equals one, $p_2$ equals two and $p_3$ equals four;

FIG. 4a represents a table representing the switching states of the switches of the first example of boost converter composed of three bridge devices in order to obtain different voltages on the bridges of the boost converter composed of three bridge devices;

FIG. 4b represents a table representing the switching states of the switches of the second example of boost converter composed of three bridge devices in order to obtain different voltages on the bridges of the boost converter composed of three bridge devices;

FIGS. 5a and 5b are examples of voltage values on the bridges of the boost converter composed of three bridge devices in order to have different step-up ratios when the first or at least one second periodical pattern is decomposed into ten time intervals;

FIGS. 6a to 6d are examples of voltage values on the bridges of the boost converter composed of three bridge devices in order to have different step-up ratios when the first or at least one second periodical pattern is decomposed into eight time intervals;

FIGS. 7a and 7b are examples of voltage values on the bridges of the boost converter composed of three bridge devices in order to have different step-up ratios when the first or at least one second periodical pattern is decomposed into seven time intervals;

FIGS. 8a and 8b are examples of voltage values on the bridges of the boost converter composed of three bridge devices in order to have different step-up ratios when the first or at least one second periodical pattern is decomposed into six time intervals;

FIGS. 9a to 9d are examples of voltage values on the bridges of the boost converter composed of three bridge devices in order to have different step-up ratios when the first or at least one second periodical pattern is decomposed into five time intervals;

FIGS. 10a and 10b are examples of voltage values on the bridges of the boost converter composed of three bridge devices in order to have different step-up ratios when the at least one third periodical pattern is selected;

FIG. 11 is an example of an algorithm for determining which periodical pattern has to be selected for the boost converter composed of three bridge devices according to the present invention.

FIG. 1a is a first example of boost converter composed of three bridge devices.

The boost converter composed of three bridge devices is also called Reactor Less Boost Converter, herein called RLBC converter.

Figure 1A:
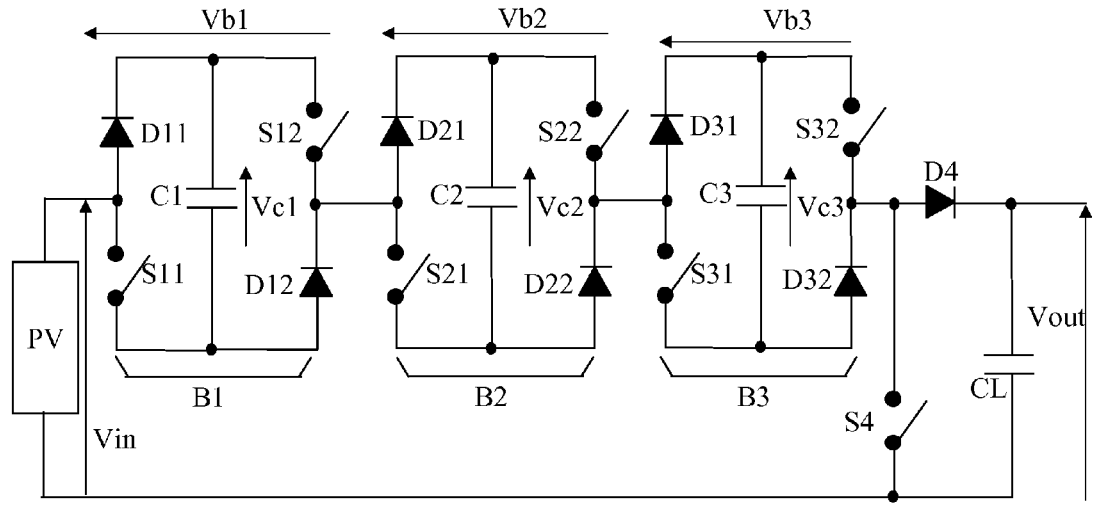
FIG. 1a is a first example of a boost converter composed of three bridge devices.

In the FIG. 1a, three bits or bridge devices B1, B2 and B3 are shown and are connected in series; the third bit B3 is connected to an output stage.

It has to be noted here that the number of bridge devices may be lower or upper than three.

Basically, the inductor of the conventional DC/DC Boost converter is replaced by "n" bridge devices connected in series. Each bridge device is composed of four switches and a capacitor as shown in FIG. 1a. It has to be noted here that two switches may be under the form of diodes acting as switches. This individual bridge structure is also called "bit".

The boost converter composed of three bridge devices also contains an output stage comprising a diode D4 and a switch S4.

The bit B1 is composed of two diodes D11 and D12, two switches S11 and S12 and one capacitor C1.

The bit B2 is composed of two diodes D21 and D22, two switches S21 and S22 and one capacitor C2.

The bit B3 is composed of two diodes D31 and D32, two switches S31 and S32 and one capacitor C3.

The output stage is also connected to a capacitor CL.

For each bit Bi with i=1, 2 or 3, the anode of the diode Di1 is linked to the first terminal of the switch Si1. The cathode of Di1 is linked to the first terminal of the switch Si2 and to the positive terminal of the capacitor Ci. The second terminal of the switch Si1 is linked to the negative terminal of the capacitor Ci and to the anode of the diode Di2. The cathode of the diode Di2 is linked to the second terminal of the switch Si2.

Electric DC providing means like photovoltaic elements PV provide an input voltage Vin. The positive terminal of electric DC providing means is connected to the anode of the diode D11.

The cathode of the diode D12 is connected to the anode of the diode D21.

The cathode of the diode D22 is connected to the anode of the diode D31.

The cathode of the diode D32 is linked to the first terminal of the switch S4 and to the anode of the diode D4. The cathode of D4 is linked to the positive terminal of the capacitor CL. The second terminal of the switch S4 is linked to the negative terminal of the capacitor CL and to the negative terminal of electric DC providing means.

The voltage on the capacitor CL is equal to Vout.

The difference of voltage between the input and the output of B1 is called Vb1, the difference of voltage between the input and the output of B2 is called Vb2 and the difference of voltage between the input and the output of B3 is called Vb3.

The difference of voltage in C1 is called Vc1, the difference of voltage in C2 is called Vc2 and the difference of voltage in C3 is called Vc3.

The main difference between conventional Boost converters and the RLBC relies on the fact that the latter can only achieve some discrete values of voltage step-up ratio (and consequently of values of duty-cycles D, where ratio=1/(1−D)), which are dependent on the number of available "bits".

Classically, this number of discrete values of step-up ratio respects the law:

$$n_{ratios}=2^n$$

where "$n_{ratios}$" is the total number of possible step-up ratios (or duty-cycles) and "n" is the number of bits connected in series.

The voltage values imposed in each bit respect the following law according to prior art:

$$[Vc1:Vc2:Vcn]=[1:2:\ldots 2^{(n-1)}]Vout/2^n$$

where "Vout" is the stepped-up output voltage. In a similar way, the possible ratios and consequent duty-cycles (D) respect the following laws:

$$ratio_i=2^n/(2^n-j),\ i=1,2,\ldots,n_{ratios}\ \text{and}\ j=i-1$$

$$D_i=1-1/ratio_i,\ i=1,2,\ldots,n_{ratios}$$

Finally, for obtaining a constant output voltage, it is possible to have "$n_{ratios}$" different input voltages, which will respect the following law:

$$Vin=Vout/ratio_i,\ i=1,2,\ldots n_{ratios}$$

In order to guarantee the right operation of the converter, for all of these "$n_{ratios}$" possibilities, the following relationship is respected:

$$\sum_{i=1}^{k} Vci = Vout * (1 - 1/(n_{ratios})), i = 1, 2, \ldots N.$$

For the case n=3 bits of FIG. 1, [Vc1:Vc2:Vc3]=[1:2:4] Vref=[1:2:4] Vout/8.

The switching pattern of the switches of each bridge Bi is defined so as to offer a voltage Vbi at the connectors of the bridge that equals +Vci, −Vci, or 0, where Vci is the voltage of the capacitor Ci. Moreover, the switching pattern of each bit Bi is timely defined as a succession of $2^n$ equal sub periods ΔT of the main switch period T=1/f. RLBC working with periodical patterns providing with [1:2:4] multiplication factors have several drawbacks.

In such case, only "$2^n$" possible discrete ratios/duty-cycles can be realised. For the n=3 bits case, only eight different boost-ratios are possible. Therefore, the regulation of the output voltage becomes difficult to realise. As duty cycle can not smoothly be selected, the output voltage must be regulated in a quite big range for a given range of input voltage. However, the range of output voltage of boost converter can not be large for specific applications, such as inverter.

Vci voltage is deterministically defined for each discrete duty cycle (Vci=$2^{i-1}$*Vout/8). This leaves no flexibility to design the power circuit with components which are rated for a maximum voltage level. Selecting a component with high rated voltage level might increase the cost of the circuit, and might also increase the switching power losses of the components.

The charge and discharge pattern of each capacitor is fixed for a given duty cycle, and different across capacitors, sometimes leading to high level of RMS current level passing through each bit. High RMS levels of current typically degrade the lifetime of the capacitors.

The present invention aims to increase the number of different boost-ratios.

The present invention proposes new switches control patterns for RLBC composed of plural bits, for example three bits B1, B2 and B3 and wherein the voltage values of at least one capacitor of a bit may be different when the selected periodical pattern is the at least one second periodical pattern or the at least one third periodical pattern. For example, for a RLBC composed of three bits, [Vc1:Vc2:Vc3] may be equal to [2:3:4]$V_{ref}$ if the selected periodical pattern is the at least one second periodical pattern and [Vc1:Vc2:Vc3] may be equal to [1:2:4]$V_{ref}$ if the selected periodical pattern is the at least one third periodical pattern.

Let us now define the switching command laws of RLBC circuit. Basically, each bit voltage Vb1 . . . Vb3 is expressed as a function of time by:

$$Vbi = \sum_{j=1}^{N} Vbij \Lambda(t - j\Delta T) \text{ with } i = 1 \text{ to } 3$$

Where Λ(t) represents the step function of time interval width ΔT. As for the control command law of switch Si1, Si2 can take their value in {0; 1}, voltage Vbij takes values in {−Vci, 0; Vci} at the jth time interval Tj according to the law $$\epsilon_{i,j} = 1 - Si1_j - Si2_j$$

Si1$_j$ and Si2$_j$ are equal to one when the switches Si1$j$ and Si2 are in ON state or conductive state at the jth time interval Tj and are equal to null value when the switches Si1$j$ and Si2 are in OFF state or non conductive state at the jth time interval Tj.

Let us further assume that Vbi is defined as an integer number of a reference voltage number, we get the following equation:

$$Vbij = \epsilon_{ij} 2^{i-1} V_{ref}$$

If we now apply the voltage balancing condition of RLBC circuit in the conduction mode (S4=1), we get:

$$\forall j \le P$$

$$Vin = \sum_{i} Vbij$$

If we now apply the voltage balancing condition of RLBC circuit in the discontinuous mode (S4=0), we get:

$$\forall j < P$$

$$Vin = \sum_{i} Vbij + Vout$$

Under steady state analysis, the balance of each capacitor charge should be verified, this can be expressed by:

$$\forall i \le K$$

$$\sum_{j=1}^{N} \epsilon_{ij} = 0$$

With above conditions met, the boost behaviour can be verified if we compute the following terms:

$$\sum_{j=1}^{N} \sum_{i=1}^{n} Vbij = \sum_{j=1}^{P} \sum_{i=1}^{n} Vbij + \sum_{j=P+1}^{N} \sum_{i=1}^{n} Vbij =$$

$$P(Vin) + (N-P)(Vin - Vout) = (P-N)vout +$$

$$NVin \sum_{j=1}^{N} \sum_{i=1}^{n} Vbij = \sum_{j=1}^{N} \sum_{i=1}^{n} 2^{i-1} V_{ref} \epsilon_{ij} = \sum_{i=1}^{n} 2^{i-1} V_{ref} \sum_{j=1}^{N} \epsilon_{ij} = 0$$

$$Vout = \frac{N}{N-P} Vin$$

Where n is equal to the number of bits.

This proves that the boost conversion of ratio D=N/N−P can be realised provided that conditions $$Vin - \sum_{i} Vbij = 0, Vin = \sum_{i} Vbij + Vout \text{ and } \sum_{j=1}^{N} \epsilon_{ij} = 0$$

are met.

$$\forall\ j \le P \sum_i Vb_{ij} = V_{ref} \sum_i \varepsilon_{ij} k_i = Vin \qquad (a)$$

$$\forall\ j > P \sum_i Vb_{ij} = V_{ref} \sum_i \varepsilon_{ij} k_i = Vin - Vout = \frac{P}{N-P} Vout \qquad (b)$$

with $k_i=2$, 3 or 4 for the first and at least one second periodical patterns and $p_i=1$, 2 or 4 for the at least one third periodical patterns.

Let us now introduce the following term $\Omega_j$:

$$\Omega_j = \sum_i k_i \varepsilon_{ij}$$

From (a) and (b), we can obtain:

$$\forall\ j \le P,\ \Omega_j = Vin/V_{ref} = \alpha(N-P)$$

$$\forall\ j > P,\ \Omega_j = -\frac{P}{N-P} Vin/V_{ref} = -P\alpha$$

$$\alpha = \frac{Vin/V_{ref}}{N-P}$$

It should be noted that, as $V_{ref}$ can be set arbitrarily, we can decide to let a equal to 1, $Vc1=2V_{ref}$, $Vc2=3V_{ref}$ and $Vc3=4V_{ref}$ for the first and at least one second periodical patterns and $Vc1=V_{ref}$, $Vc2=2\ V_{ref}$ and $Vc3=4\ V_{ref}$ for the at least one third periodical patterns. Thus, it is enough to find a set of switching rules $\{\varepsilon_{ij}\}$ $$\begin{cases} \forall\ j \le P,\ \Omega_j = N-P \\ \forall\ j > P,\ \Omega_j = -P \end{cases}$$

It should be noted that $V_{ref}$ can be further expressed as $$V_{ref} = \frac{Vout}{N}$$

Finding a solution to the switching pattern of RLBC with n bits consists, for a given pair of integers $\{N, P\}$ and a given vector K of integers in finding a matrix ($\varepsilon$) of size (N×n) and with elements in $\{-1; 0; 1\}$ such that (i)

the matrix ($\varepsilon$) verifies $\forall\ i \le K \sum_{j=1}^{N} \varepsilon_{ij} = 0$ and (ii) $\vec{\Omega}=(\Omega_1;\Omega_2;\ldots;\Omega_N)=(\varepsilon)\cdot\vec{K}$ has P elements of value N–P, and N–P elements of values –P.

For the first and at least one second periodical patterns of the present invention the vector K of integers is [2 3 4] and each matrix disclosed in FIGS. 5 to 9 verifies the conditions (i) and (ii).

For the at least one third periodical patterns of the present invention the vector K of integers is [1 2 4] and each matrix disclosed in FIG. 10 verifies the conditions (i) and (ii).

Figure 1B:
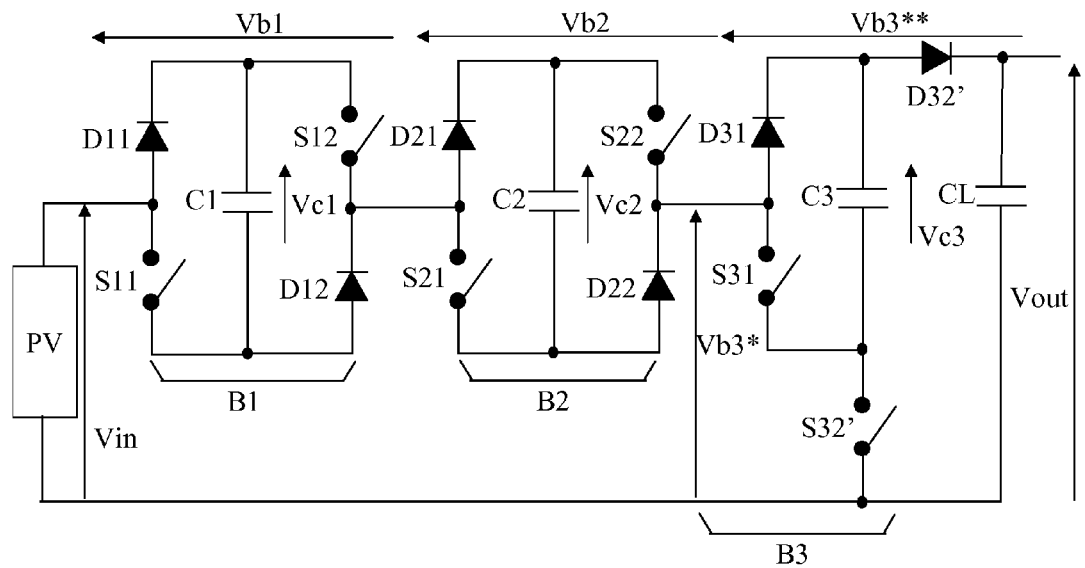
FIG. 1b is a second example of a boost converter composed of three bridge devices.

FIG. 1b is a second example of boost converter composed of three bridge devices.

As it has been disclosed in reference to the FIG. 1a, the inductor of the conventional DC/DC Boost converter is replaced by "n" equal to three bridge devices connected in series. Each bridge device is composed of four switches and a capacitor as shown in FIG. 1. This individual bridge structure is also called "bit".

In the FIG. 1b, three bits B1, B2 and B3 are shown.

The bit B1 is composed of two diodes D11 and D12, two switches S11 and S12 and one capacitor C1.

The bit B2 is composed of two diodes D21 and D22, two switches S21 and S22 and one capacitor C2.

The bit B3 is composed of two diodes D31 and D32', two switches S31 and S32' and one capacitor C3.

For each bit Bi with i=1 or 2, the anode of the diode Di1 is linked to the first terminal of the switch Si1. The cathode of Di1 is linked to the first terminal of the switch Si2 and to the positive terminal of the capacitor Ci. The second terminal of the switch Si1 is linked to the negative terminal of the capacitor Ci and to the anode of the diode Di2. The cathode of diode Di2 is linked to the second terminal of the switch Si2.

The anode of the diode D31 is linked to the first terminal of the switch S31. The cathode of D31 is linked to the positive terminal of the capacitor C3 and to the anode of the diode D32'. The second terminal of the switch S31 is linked to the negative terminal of the capacitor C3 and to the first terminal of the switch S32'.

Electric DC providing means like photovoltaic elements PV provide an input voltage Vin. The positive terminal of electric DC providing means is connected to the anode of the diode D11.

The cathode of the diode D12 is connected to the anode of the diode D21.

The cathode of the diode D22 is connected to the anode of the diode D31.

The cathode of the diode D32' is connected to the positive terminal of the capacitor CL.

The negative terminal of the capacitor CL and the second terminal of the switch S32' are connected to the negative terminal of electric DC providing means.

The switch S32' acts similarly to switch S4 of FIG. 1a and the diode D32' acts as diode D4 of FIG. 1a.

The voltage on the capacitor CL is equal to Vout.

The difference of voltage between the input and the output of B1 is called Vb1, the difference of voltage between the input and the output of B2 is called Vb2 and the difference of voltage between the input and the output of B3 is called Vb3. Vb3 equals Vb3* when switch S32' is on, and equals Vb3** when switch S32' is off.

Figures 2, 3A:
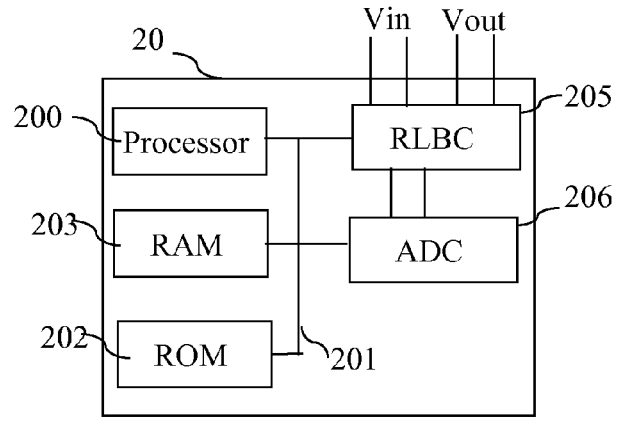
FIG. 2 represents an example of a device comprising a boost converter.
FIG. 3a represents a table representing the different step-up ratios that can be provided by the first or at least one second periodical pattern according to the present invention when $k_1$ equals two, $k_2$ equals three and $k_3$ equals four.

FIG. 2 represents an example of a device comprising a boost converter composed of plural bridge devices.

Figures 10B, 11:
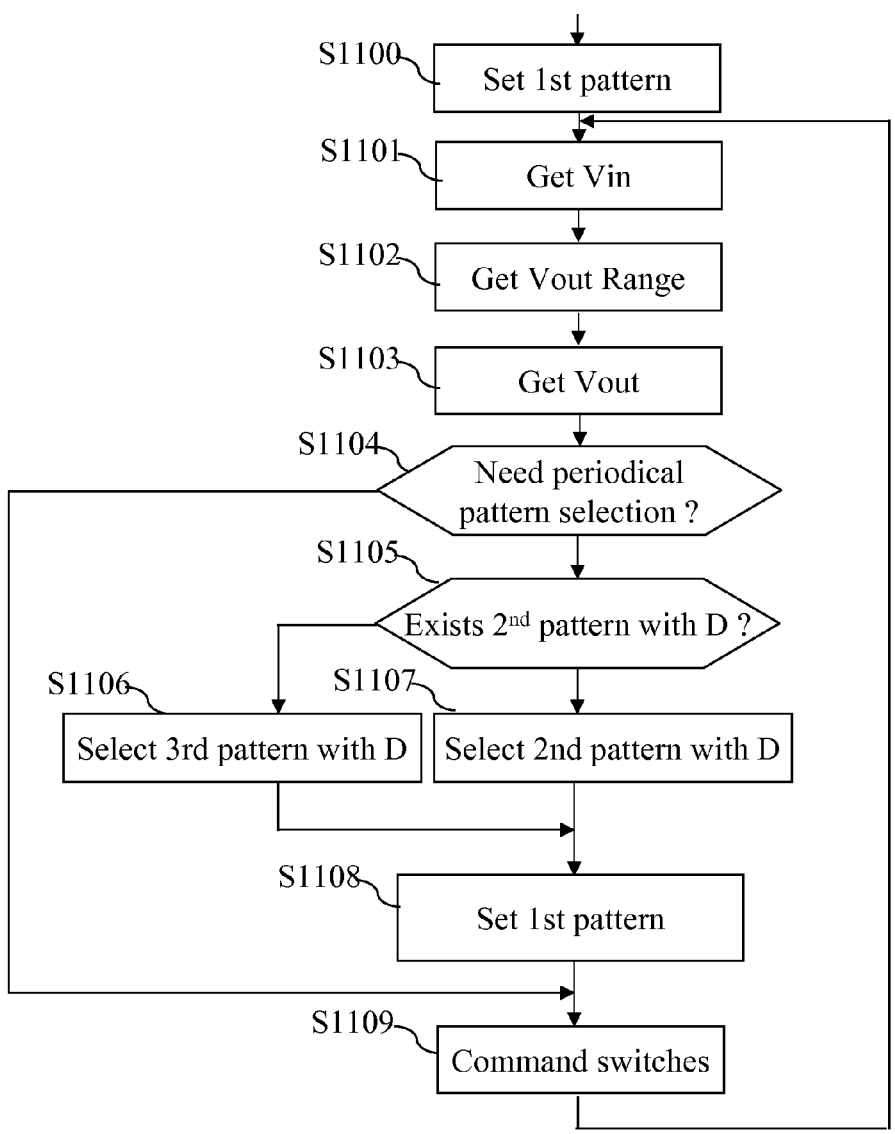

The device 20 has, for example, an architecture based on components connected together by a bus 201 and a processor 200 controlled by the program related to the algorithm as disclosed in the FIG. 11.

It has to be noted here that the device 20 is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203, an analogue to digital converter ADC 206 and the RLBC module as the one disclosed in FIG. 1.

The read only memory ROM 202 contains instructions of the program related to the algorithm as disclosed in the FIG.

11 which are transferred, when the device 20 is powered on to the random access memory RAM 203.

The read only memory ROM 202 memorizes the tables shown in FIGS. 3 to 10 of the present invention.

The RAM memory 203 contains registers intended to receive variables, and the instructions of the program related to the algorithm as disclosed in the FIG. 11.

The analogue to digital converter 206 is connected to the RLBC and converts voltages representative of the input voltage Vin and/or the output voltage Vout into binary information.

FIG. 3a represents a table representing the different step-up ratios that can be provided by the first and at least one second periodical pattern according to the present invention when $k_1$ equals two, $k_2$ equals three and $k_3$ equals four.

The table of the FIG. 3a comprises six columns noted 300 to 306. The column 300 shows different values of the input voltage Vin applied on the RLBC. The column 301 shows the output voltage Vout of the RLBC. The output voltage is for example equal to 240 Volts. The column 302 shows the different ratios between the output voltage Vout and the input voltage Vin. The column 303 shows the different duty cycles D of the RLBC. The column 304 shows the different values of the couples N and P. The column 305 shows the different values of the reference voltage $V_{ref}$. The column 306 shows the Figs to be selected according to the input voltage value Vin.

In line 310, the input voltage is equal to 24 Volts, the output voltage is 240 Volts, the ratio Vout/Vin equals 10, the duty cycle D equals 0.9, the couple (N,P) equals (10,9), the reference voltage $V_{ref}$ equals 24 Volts and the switching pattern to select in order to get the ratio of 10 is disclosed in the FIG. 5a.

In line 311, the input voltage is equal to 30 Volts, the output voltage is 240 Volts, the ratio Vout/Vin equals 8, the duty cycle D equals 0.875, the couple (N,P) equals (8,7), the reference voltage $V_{ref}$ equals 30 Volts and the switching pattern to select in order to get the ratio of 8 is disclosed in the FIG. 6d.

In line 312, the input voltage is equal to 34.3 Volts, the output voltage is 240 Volts, the ratio Vout/Vin equals 7, the duty cycle D equals 0.857, the couple (N,P) equals (7,6), the reference voltage $V_{ref}$ equals 34.3 Volts and the switching pattern to select in order to get the ratio of 7 is disclosed in the FIG. 7b.

In line 313, the input voltage is equal to 40 Volts, the output voltage is 240 Volts, the ratio Vout/Vin equals 6, the duty cycle D equals 0.833, the couple (N,P) equals (6,5), the reference voltage $V_{ref}$ equals 40 Volts and the switching pattern to select in order to get the ratio of 6 is disclosed in the FIG. 8a.

In line 314, the input voltage is equal to 48 Volts, the output voltage is 240 Volts, the ratio Vout/Vin equals 5, the duty cycle D equals 0.8, the couple (N,P) equals (5,4), the reference voltage $V_{ref}$ equals 48 Volts and the switching pattern to select in order to get the ratio of 5 is disclosed in the FIG. 9a.

In line 315, the input voltage is equal to 90 Volts, the output voltage is 240 Volts, the ratio Vout/Vin equals 2.67, the duty cycle D equals 0.625, the couple (N,P) equals (8,5), the reference voltage $V_{ref}$ equals 30 Volts and the switching pattern to select in order to get the ratio of 2.67 is disclosed in the FIG. 6b.

In line 316, the input voltage is equal to 96 Volts, the output voltage is 240 Volts, the ratio Vout/Vin equals 2.5, the duty cycle D equals 0.6, the couple (N,P) equals (5,3), the reference voltage $V_{ref}$ equals 48 Volts and the switching pattern to select in order to get the ratio of 2.5 is disclosed in the FIG. 9b.

In line 317, the input voltage is equal to 144 Volts, the output voltage is 240 Volts, the ratio Vout/Vin equals 1.67, the duty cycle D equals 0.4, the couple (N,P) equals (5,2), the reference voltage $V_{ref}$ equals 48 Volts and the switching pattern to select in order to get the ratio of 1.67 is disclosed in the FIG. 9c.

In line 318, the input voltage is equal to 150 Volts, the output voltage is 240 Volts, the ratio Vout/Vin equals 1.6, the duty cycle D equals 0.375, the couple (N,P) equals (8,3), the reference voltage $V_{ref}$ equals 30 Volts and the switching pattern to select in order to get the ratio of 1.6 is disclosed in the FIG. 6c.

In line 319, the input voltage is equal to 192 Volts, the output voltage is 240 Volts, the ratio Vout/Vin equals 1.25, the duty cycle D equals 0.2, the couple (N,P) equals (5,1), the reference voltage $V_{ref}$ equals 48 Volts and the switching pattern to select in order to get the ratio of 1.25 is disclosed in the FIG. 9d.

In line 320, the input voltage is equal to 200 Volts, the output voltage is 240 Volts, the ratio Vout/Vin equals 1.2, the duty cycle D equals 0.166, the couple (N,P) equals (6,1), the reference voltage $V_{ref}$ equals 40 Volts and the switching pattern to select in order to get the ratio of 1.2 is disclosed in the FIG. 8b.

In line 321, the input voltage is equal to 205.7 Volts, the output voltage is 240 Volts, the ratio Vout/Vin equals 1.16, the duty cycle D equals 0.142, the couple (N,P) equals (7,1), the reference voltage $V_{ref}$ equals 34.3 Volts and the switching pattern to select in order to get the ratio of 1.16 is disclosed in the FIG. 7a.

In line 322, the input voltage is equal to 210 Volts, the output voltage is 240 Volts, the ratio Vout/Vin equals 1.14, the duty cycle D equals 0.125, the couple (N,P) equals (8,1), the reference voltage $V_{ref}$ equals 30 Volts and the switching pattern to select in order to get the ratio of 1.14 is disclosed in the FIG. 6a.

In line 323, the input voltage is equal to 216 Volts, the output voltage is 240 Volts, the ratio Vout/Vin equals 1.11, the duty cycle D equals 0.1, the couple (N,P) equals (10,1), the reference voltage $V_{ref}$ equals 24 Volts and the switching pattern to select in order to get the ratio of 1.1 is disclosed in the FIG. 5b.

FIG. 3b represents a table representing the different step-up ratios that can be provided by the at least one third periodical pattern according to the present invention when $p_1$ equals one, $p_2$ equals two and $p_3$ equals four.

The table of the FIG. 3b comprises six columns noted 350 to 356. The column 350 shows different values of the input voltage Vin applied on the RLBC. The column 351 shows the output voltage Vout of the RLBC. The output voltage is for example equal to 240 Volts. The column 352 shows the different ratios between the output voltage Vout and the input voltage Vin. The column 353 shows the different duty cycles D of the RLBC. The column 354 shows the different values of the couples N and P. The column 355 shows the different values of the reference voltage $V_{ref}$. The column 356 shows the Figs to be selected according to the input voltage value Vin.

In line 361, the input voltage is equal to 60 Volts, the output voltage is 240 Volts, the ratio Vout/Vin equals 4, the duty cycle D equals 0.75, the couple (N,P) equals (8,6), the reference voltage $V_{ref}$ equals 30 Volts and the switching pattern to select in order to get the ratio of 4 is disclosed in the FIG. 10a.

In line 362, the input voltage is equal to 48 Volts, the output voltage is 240 Volts, the ratio Vout/Vin equals 5, the duty cycle D equals 0.8, the couple (N,P) equals (5,4), the reference voltage $V_{ref}$ equals 30 Volts and the switching pattern to select in order to get the ratio of 5 is disclosed in the FIG. 10b.

FIG. 4a represents a table representing the switching states of the switches of the first example of boost converter shown in FIG. 1a in order to obtain different voltages on bridges of the boost converter composed of three bridge devices.

The columns 400 to 402 are related to the bit B1, the columns 403 to 405 are related to the bit B2 and the columns 406 to 408 are related to the bit B3.

The line 411 shows that for a voltage Vb1 which is equal to Vc1, the switch S11 is in non conductive state and the switch S12 is in non conductive state, for a voltage Vb2 which is equal to Vc2, the switch S21 is in non conductive state and the switch S22 is in non conductive state, for a voltage Vb3 which is equal to Vc3, the switch S31 is in non conductive state and the switch S32 is in non conductive state.

The line 412 shows that for a voltage Vb1 which is equal to null value, the switch S11 is in non conductive state and the switch S12 is in conductive state, for a voltage Vb2 which is equal to null value, the switch S21 is in non conductive state and the switch S22 is in conductive state, for a voltage Vb3 which is equal to null value, the switch S31 is in conductive state when the switch S32 is in non conductive state or the switch S31 is in non conductive state when the switch S32 is in conductive state.

The line 413 shows that for a voltage Vb1 which is equal to −Vc1, the switch S11 is in conductive state and the switch S12 is in conductive state, for a voltage Vb2 which is equal to −Vc2, the switch S21 is in conductive state and the switch S22 is in conductive state, for a voltage Vb3 which is equal to −Vc3, the switch S31 is in conductive state and the switch S32 is in conductive state.

FIG. 4b represents a table representing the switching states of the switches of the second example of boost converter shown in FIG. 1b in order to obtain different voltages on bridges of the boost converter composed of three bridge devices.

The columns 420 to 422 are related to the bit B1, the columns 423 to 425 are related to the bit B2 and the columns 426 to 428 are related to the bit B3.

The line 431 shows that for a voltage Vb1 which is equal to Vc1, the switch S11 is in non conductive state and the switch S12 is in non conductive state, for a voltage Vb2 which is equal to Vc2, the switch S21 is in non conductive state and the switch S22 is in non conductive state, for a voltage Vb3 which is equal to Vc3, the switch S31 is in non conductive state and the switch S32' is in conductive state.

The line 432 shows that for a voltage Vb1 equal to null value, the switch S11 is in non conductive state and the switch S12 is in conductive state, for a voltage Vb2 which is equal to null value, the switch S21 is in non conductive state and the switch S22 is in conductive state and for a voltage Vb3 which is equal to null value, the switches S31 and S32' are together either in conductive state or in non conductive state.

The line 433 shows that for a voltage Vb1 which is equal to −Vc1, the switch S11 is in conductive state and the switch S12 is in conductive state, for a voltage Vb2 which is equal to −Vc2, the switch S21 is in conductive state and the switch S22 is in conductive state, for a voltage Vb3 which is equal to −Vc3, the switch S31 is in conductive state and the switch S32' is in non conductive state.

According to an example of realisation of the invention, Vc1=2$V_{ref}$; Vc2=3$_{Vref}$ and Vc3=4$_{Vref}$ when the selected periodical pattern of the at least one second periodical pattern and Vc1=$V_{ref}$; Vc2=2$_{Vref}$ and Vc3=4$_{Vref}$ when the selected periodical pattern is the at least one third periodical pattern.

FIGS. 5a and 5b are examples of voltage values on the bridges of the boost converter in order to have different step-up ratios when the first or at least one second periodical pattern is decomposed into ten time intervals.

In the lines 501 and 511, a value which is equal to 1 means that Vb1=2$V_{ref}$, a value which is equal to −1 means Vb1=−2$V_{ref}$ and a value which is equal to 0 means Vb1=0.

In the lines 501 and 511, a value which is equal to 1 means that Vb2=3$V_{ref}$, a value which is equal to −1 means Vb2=−3$V_{ref}$ and a value which is equal to 0 means Vb2=0.

In the lines 501 and 511, a value which is equal to 1 means that Vb3=4$V_{ref}$, a value which is equal to −1 means Vb3=−4$V_{ref}$ and a value which is equal to 0 means Vb3=0.

The duration of each time interval T1 to T10 is ΔT=T/N (N=10), where T is the duration of the cycle operated by switch S4 of the FIG. 1a or by switch S32' of FIG. 1b.

FIG. 5a comprises voltage values on the bridges of the RLBC in order to have a ratio Vout/Vin=N/(N−P)=10 (D=0.9).

Ten time intervals are needed in order to get a ratio Vout/Vin=10.

At time intervals T1 and T2, Vb1=−2$V_{ref}$, Vb2=3$V_{ref}$ and Vb3=0. At time intervals T3, T4, T5 and T6, Vb1=0, Vb2=−3$V_{ref}$ and Vb3=4$V_{ref}$. At time intervals T7, T8 and T9, Vb1=2$V_{ref}$, Vb2=3$V_{ref}$ and Vb3=−4$V_{ref}$. At time interval T10, Vb1=−2$V_{ref}$, Vb2=−3$V_{ref}$ and Vb3=−4$V_{ref}$.

When the voltage values are the one of the bridges of the boost converter of FIG. 1a, the switch S4 is in conductive state during time intervals T1 to T9 (P=9) and in non conductive state at time interval T10 (N=10).

FIG. 5b comprises voltage values on the bridges of the RLBC in order to have a ratio Vout/Vin=N/(N−P)=1.11 (D=0.1).

Ten time intervals are needed in order to get a ratio Vout/Vin=1.11.

At time interval T1, Vb1=2$V_{ref}$, Vb2=3$V_{ref}$ and Vb3=4$V_{ref}$. At time intervals T2 and T3, Vb1=2$V_{ref}$, Vb2=−3$V_{ref}$ and Vb3=0. At time intervals T4, T5, T6 and T7, Vb1=0, Vb2=3$V_{ref}$ and Vb3=−4$V_{ref}$. At time intervals T8, T9 and T10, Vb1=−2$V_{ref}$, Vb2=−3$V_{ref}$ and Vb3=4$V_{ref}$.

When the voltage values are the one of the bridges of the boost converter of FIG. 1a, the switch S4 is in conductive state during time interval T1 (P=1) and in non conductive state at time intervals T2 to T10 (N=10).

FIGS. 6a to 6d are examples of voltage values on the bridges of the boost converter composed of three bridge devices in order to have different step-up ratios when the first or at least one second periodical pattern is decomposed into eight time intervals.

In the lines 601, 611, 621 and 631 a value which is equal to 1 means that Vb1=2$V_{ref}$, a value which is equal to −1 means Vb1=−2$V_{ref}$ and a value which is equal to 0 means Vb1=0.

In the lines 602, 612, 622 and 632, a value which is equal to 1 means that Vb2=3$V_{ref}$, a value which is equal to −1 means Vb2=−3$V_{ref}$ and a value which is equal to 0 means Vb2=0.

In the lines 603, 613, 623 and 633, a value which is equal to 1 means that Vb3=4$V_{ref}$, a value which is equal to −1 means Vb3=−4$V_{ref}$ and a value which is equal to 0 means Vb3=0.

The duration of each time interval T1 to T8 is ΔT=T/N (N=8), where T is the duration of the cycle operated by switch S4 of the FIG. 1a or by switch S32' of FIG. 1b.

FIG. 6a comprises voltage values on the bridges of the RLBC in order to have a ratio Vout/Vin=N/(N−P)=1.14 (D=0.125).

Eight time intervals are needed in order to get a ratio Vout/Vin=1.14.

At time interval T1, Vb1=0, Vb2=3$V_{ref}$ and Vb3=4$V_{ref}$. At time intervals T2 and T3, Vb1=2$V_{ref}$, Vb2=−3$V_{ref}$ and Vb3=0. At time intervals T4, T5 and T6, Vb1=0, Vb2=3$V_{ref}$ and Vb3=−4$V_{ref}$. At time intervals T7 and T8, Vb1=−2$V_{ref}$, Vb2=−3$V_{ref}$ and Vb3=4$V_{ref}$.

When the voltage values are the one of the bridges of the boost converter of FIG. 1a, the switch S4 is in conductive state at time interval T1 (P=1) and in non conductive state during time intervals T2 to T8 (N=8).

FIG. 6b comprises voltage values on the bridges of the RLBC in order to have a ratio Vout/Vin=N/(N−P)=2.67 (D=0.625).

Eight time intervals are needed in order to get a ratio Vout/Vin=2.67.

At time interval T1, Vb1=$2V_{ref}$, Vb2=$-3V_{ref}$ and Vb3=$4V_{ref}$. At time intervals T2, T3, T4 and T5 Vb1=0, Vb2=$3V_{ref}$ and Vb3=0. At time intervals T6 and T7, Vb1=$-2V_{ref}$, Vb2=$-3V_{ref}$ and Vb3=0. At time interval T8, Vb1=$2V_{ref}$, Vb2=$-3V_{ref}$ and Vb3=$-4V_{ref}$.

When the voltage values are the one of the bridges of the boost converter of FIG. 1a, the switch S4 is in conductive state during time intervals T1 to T5 (P=5) and in non conductive state at time intervals T6 to T8 (N=8).

FIG. 6c comprises voltage values on the bridges of the RLBC in order to have a ratio Vout/Vin=N/(N−P)=1.6 (D=0.375).

Eight time intervals are needed in order to get a ratio Vout/Vin=1.6.

At time interval T1, Vb1=$-2V_{ref}$, Vb2=$3V_{ref}$ and Vb3=$4V_{ref}$. At time intervals T2 and T3, Vb1=$2V_{ref}$, Vb2=$3V_{ref}$ and Vb3=0. At time interval T4, Vb1=$-2V_{ref}$, Vb2=$3V_{ref}$ and Vb3=$-4V_{ref}$. At time intervals T5, T6, T7 and T8, Vb1=0, Vb2=$-3V_{ref}$ and Vb3=0.

When the voltage values are the one of the bridges of the boost converter of FIG. 1a, the switch S4 is in conductive state during time intervals T1 to T3 (P=3) and in non conductive state at time intervals T4 to T8 (N=8).

FIG. 6d comprises voltage values on the bridges of the RLBC in order to have a ratio Vout/Vin=N/(N−P)=8 (D=0.875).

Eight time intervals are needed in order to get a ratio Vout/Vin=8.

At time intervals T1 and T2, Vb1=$-2V_{ref}$, Vb2=$3V_{ref}$ and Vb3=0. At time intervals T3, T4 and T5, Vb1=0, Vb2=$-3V_{ref}$ and Vb3=$4V_{ref}$. At time intervals T6 and T7, Vb1=$2V_{ref}$, Vb2=$3V_{ref}$ and Vb3=$-4V_{ref}$. At time interval T8, Vb1=0, Vb2=$-3V_{ref}$ and Vb3=$-4V_{ref}$.

When the voltage values are the one of the bridges of the boost converter of FIG. 1a, the switch S4 is in conductive state during time intervals T1 to T1 (P=7) and in non conductive state at time intervals T2 to T8 (N=8).

FIGS. 7a and 7b are examples of voltage values on the bridges of the boost converter composed of three bridge devices in order to have different step-up ratios when the first or at least one second periodical pattern is decomposed into seven time intervals.

In the lines 701 and 711, a value which is equal to 1 means that Vb1=$2V_{ref}$, a value which is equal to −1 means Vb1=$-2V_{ref}$ and a value which is equal to 0 means Vb1=0.

In the lines 702 and 712, a value which is equal to 1 means that Vb2=$3V_{ref}$, a value which is equal to −1 means Vb2=$-3V_{ref}$ and a value which is equal to 0 means Vb2=0.

In the lines 703 and 713, a value which is equal to 1 means that Vb3=$4V_{ref}$, a value which is equal to −1 means Vb3=$-4V_{ref}$ and a value which is equal to 0 means Vb3=0.

The duration of each time interval T1 to T7 is ΔT=T/N (N=7), where T is the duration of the cycle operated by switch S4 of the FIG. 1a or by switch S32' of FIG. 1b.

FIG. 7a comprises voltage values on the bridges of the RLBC in order to have a ratio Vout/Vin=N/(N−P)=1.16 (D=0.142).

Seven time intervals are needed in order to get a ratio Vout/Vin=1.16.

At time interval T1, Vb1=$2V_{ref}$, Vb2=0 and Vb3=$4V_{ref}$. At time intervals T2, T3, and T4, Vb1=0, Vb2=$3V_{ref}$ and Vb3=$-4V_{ref}$. At time interval T5, Vb1=$2V_{ref}$, Vb2=$-3V_{ref}$ and Vb3=0. At time intervals T6 and T7, Vb1=$-2V_{ref}$, Vb2=$-3V_{ref}$ and Vb3=$4V_{ref}$.

When the voltage values are the one of the bridges of the boost converter of FIG. 1a, the switch S4 is in conductive state during time intervals T1 to T6 (P=1) and in non conductive state at time interval T7 (N=7).

FIG. 7b comprises voltage values on the bridges of the RLBC in order to have a ratio Vout/Vin=N/(N−P)=7 (D=0.857).

Seven time intervals are needed in order to get a ratio Vout/Vin=7.

At time intervals T1 and T2, Vb1=$2V_{ref}$, Vb2=$3V_{ref}$ and Vb3=$-4V_{ref}$. At time intervals T3, T4 and T5, Vb1=0, Vb2=$-3V_{ref}$ and Vb3=$4V_{ref}$. At time interval T6, Vb1=$-2V_{ref}$, Vb2=$3V_{ref}$ and Vb3=0. At time interval T7, Vb1=$-2V_{ref}$, Vb2=0 and Vb3=$-4V_{ref}$.

When the voltage values are the one of the bridges of the boost converter of FIG. 1a, the switch S4 is in conductive state during time interval T1 (P=6) and in non conductive state at time intervals T2 to T7 (N=7).

FIGS. 8a and 8b are examples of voltage values on the bridges of the boost converter composed of three bridge devices in order to have different step-up ratios when the first or at least one second periodical pattern is decomposed into six time intervals.

In the lines 801 and 811, a value which is equal to 1 means that Vb1=$2V_{ref}$, a value which is equal to −1 means Vb1=$-2V_{ref}$ and a value which is equal to 0 means Vb1=0.

In the lines 802 and 812, a value which is equal to 1 means that Vb2=$3V_{ref}$, a value which is equal to −1 means Vb2=$-3V_{ref}$ and a value which is equal to 0 means Vb2=0.

In the lines 803 and 813, a value which is equal to 1 means that Vb3=$4V_{ref}$, a value which is equal to −1 means Vb3=$-4V_{ref}$ and a value which is equal to 0 means Vb3=0.

The duration of each time interval T1 to T6 is ΔT=T/N (N=6), where T is the duration of the cycle operated by switch S4 of the FIG. 1a or by switch S32' of FIG. 1b.

FIG. 8a comprises voltage values on the bridges of the RLBC in order to have a ratio Vout/Vin=N/(N−P)=6 (D=0.833).

Six time intervals are needed in order to get a ratio Vout/Vin=6.

At time interval T1, Vb1=$2V_{ref}$, Vb2=$3V_{ref}$ and Vb3=$-4V_{ref}$. At time intervals T2 and T3, Vb1=0, Vb2=$-3V_{ref}$ and Vb3=$4V_{ref}$. At time intervals T4 and T5, Vb1=$-2V_{ref}$, Vb2=$3V_{ref}$ and Vb3=0. At time interval T6, Vb1=$2V_{ref}$, Vb2=$-3V_{ref}$ and Vb3=$-4V_{ref}$.

When the voltage values are the one of the bridges of the boost converter of FIG. 1a, the switch S4 is in conductive state during time intervals T1 to T5 (P=5) and in non conductive state at time interval T6 (N=6).

FIG. 8b comprises voltage values on the bridges of the RLBC in order to have a ratio Vout/Vin=N/(N−P)=1.2 (D=0.166).

Six time intervals are needed in order to get a ratio Vout/Vin=1.2.

At time interval T1, Vb1=$-2V_{ref}$, Vb2=$3V_{ref}$ and Vb3=$4V_{ref}$. At time interval T2, Vb1=$-2V_{ref}$, Vb2=$-3V_{ref}$ and Vb3=$4V_{ref}$. At time intervals T3 and T4, Vb1=0, Vb2=$3V_{ref}$ and Vb3=$-4V_{ref}$. At time intervals T5 and T6, Vb1=$2V_{ref}$, Vb2=$-3V_{ref}$ and Vb3=$0V_{ref}$.

When the voltage values are the one of the bridges of the boost converter of FIG. 1a, the switch S4 is in conductive state during time interval T1 (P=1) and in non conductive state at time intervals T2 to T6 (N=6).

FIGS. 9a to 9d are examples of voltage values on the bridges of the boost converter composed of three bridge devices in order to have different step-up ratios when the first or at least one second periodical pattern is decomposed into five time intervals.

In the lines 901, 911, 921 and 931 a value which is equal to 1 means that $Vb1=2V_{ref}$, a value which is equal to $-1$ means $Vb1=-2V_{ref}$ and a value which is equal to 0 means $Vb1=0$.

In the lines 902, 912, 922 and 932, a value which is equal to 1 means that $Vb2=3V_{ref}$, a value which is equal to $-1$ means $Vb2=-3V_{ref}$ and a value which is equal to 0 means $Vb2=0$.

In the lines 903, 913, 923 and 933, a value which is equal to 1 means that $Vb3=4V_{ref}$, a value which is equal to $-1$ means $Vb3=-4V_{ref}$ and a value which is equal to 0 means $Vb3=0$.

The duration of each time interval T1 to T5 is $\Delta T=T/N$ (N=5), where T is the duration of the cycle operated by switch S4 of the FIG. 1a or by switch S32' of FIG. 1b.

FIG. 9a comprises voltage values on the bridges of the RLBC in order to have a ratio Vout/Vin=N/(N−P)=5 (D=0.8).

Five time intervals are needed in order to get a ratio Vout/Vin=5.

At time interval T1, $Vb1=2V_{ref}$, $Vb2=3V_{ref}$ and $Vb3=-4V_{ref}$. At time intervals T2 and T3, $Vb1=0$, $Vb2=-3V_{ref}$ and $Vb3=4V_{ref}$. At time interval T4, $Vb1=-2V_{ref}$, $Vb2=3V_{ref}$ and $Vb3=0$. At time interval T5, $Vb1=0$, $Vb2=0$ and $Vb3=-4V_{ref}$.

When the voltage values are the one of the bridges of the boost converter of FIG. 1a, the switch S4 is in conductive state during time intervals T1 to T4 (P=4) and in non conductive state at time interval T5 (N=5).

FIG. 9b comprises voltage values on the bridges of the RLBC in order to have a ratio Vout/Vin=N/(N−P)=2.5 (D=0.6).

Five time intervals are needed in order to get a ratio Vout/Vin=2.5.

At time interval T1, $Vb1=-2V_{ref}$, $Vb2=0$ and $Vb3=4V_{ref}$. At time intervals T2 and T3, $Vb1=2V_{ref}$, $Vb2=0$ and $Vb3=0$. At time interval T4, $Vb1=0$, $Vb2=-3V_{ref}$ and $Vb3=0$. At time interval T5, $Vb1=-2V_{ref}$, $Vb2=3V_{ref}$ and $Vb3=-4V_{ref}$.

When the voltage values are the one of the bridges of the boost converter of FIG. 1a, the switch S4 is in conductive state during time intervals T1 to T3 (P=3) and in non conductive state at time intervals T4 and T5 (N=5).

FIG. 9c comprises voltage values on the bridges of the RLBC in order to have a ratio Vout/Vin=N/(N−P)=1.67 (D=0.4).

Five time intervals are needed in order to get a ratio Vout/Vin=1.67.

At time interval T1, $Vb1=2V_{ref}$, $Vb2=-3V_{ref}$ and $Vb3=4V_{ref}$. At time interval T2, $Vb1=0$, $Vb2=3V_{ref}$ and $Vb3=0$. At time interval T3, $Vb1=2V_{ref}$, $Vb2=0$ and $Vb3=-4V_{ref}$. At time intervals T4 and T5, $Vb1=-2V_{ref}$, $Vb2=0$ and $Vb3=0$.

When the voltage values are the one of the bridges of the boost converter of FIG. 1a, the switch S4 is in conductive state during time intervals T1 and T2 (P=2) and in non conductive state at time intervals T3 to T5 (N=5).

FIG. 9d comprises voltage values on the bridges of the RLBC in order to have a ratio Vout/Vin=N/(N−P)=1.25 (D=0.2).

Five time intervals are needed in order to get a ratio Vout/Vin=1.25.

At time interval T1, $Vb1=0$, $Vb2=0$ and $Vb3=4V_{ref}$. At time interval T2, $Vb1=-2V_{ref}$, $Vb2=-3V_{ref}$ and $Vb3=4V_{ref}$. At time intervals T3 and T4, $Vb1=0$, $Vb2=3V_{ref}$ and $Vb3=-4V_{ref}$. At time interval T5, $Vb1=2V_{ref}$, $Vb2=-3V_{ref}$ and $Vb3=0$.

When the voltage values are the one of the bridges of the boost converter of FIG. 1a, the switch S4 is in conductive state during time interval T1 (P=1) and in non conductive state at time intervals T2 to T5 (N=5).

FIGS. 10a and 10b are examples of voltage values on the bridges of the boost converter composed of three bridge devices in order to have different step-up ratios when the at least one third periodical pattern is selected.

In the lines 1001 and 1011, a value which is equal to 1 means that $Vb1=V_{ref}$, a value which is equal to $-1$ means $Vb1=-V_{ref}$ and a value which is equal to 0 means $Vb1=0$.

In the lines 1002 and 1012, a value which is equal to 1 means that $Vb2=2V_{ref}$, a value which is equal to $-1$ means $Vb2=-2V_{ref}$ and a value which is equal to 0 means $Vb2=0$.

In the lines 1003 and 1013, a value which is equal to 1 means that $Vb3=4V_{ref}$, a value which is equal to $-1$ means $Vb3=-4V_{ref}$ and a value which is equal to 0 means $Vb3=0$.

FIG. 10a comprises voltage values on the bridges of the RLBC in order to have a ratio Vout/Vin=4.

Eight time intervals are needed in order to get a ratio Vout/Vin=4.

The duration of each time interval T1 to T8 is $\Delta T=T/N$ (N=8), where T is the duration of the cycle operated by switch S4 of the FIG. 1a or by switch S32' of the FIG. 1b.

At time intervals T1, T2, T3 and T4, $Vb2=2V_{ref}$, $Vb1=Vb3=0$. At time intervals T5 and T6, $Vb1=0$, $Vb2=-2V_{ref}$ and $Vb3=4V_{ref}$. At time intervals T7 and T8, $Vb1=0$, $Vb2=-2V_{ref}$ and $Vb3=-4V_{ref}$.

When the voltage values are the one of the bridges of the boost converter of FIG. 1a, the switch S4 is in conductive state during time intervals T1 to T6 (P=6) and in non conductive state at time intervals T7 and T8 (N=8).

FIG. 10b comprises voltage values on the bridges of the RLBC in order to have a ratio Vout/Vin=5.

Five time intervals are needed in order to get a ratio Vout/Vin=5.

The duration of each time interval T1 to T5 is $\Delta T=T/N$ (N=5), where T is the duration of the cycle operated by switch S4 of the FIG. 1a or by switch S32' of the FIG. 1b.

At time interval T1, $Vb1=-V_{ref}$, $Vb2=-2V_{ref}$ and $Vb3=4V_{ref}$. At time interval T2, $Vb1=-V_{ref}$, $Vb2=2V_{ref}$ and $Vb3=0$. At time intervals T3 and T4, $Vb1=V_{ref}$, $Vb2=0$ and $Vb3=0$. At time interval T5, $Vb1=0$, $Vb2=0$ and $Vb3=-4V_{ref}$.

When the voltage values are the one of the bridges of the boost converter of FIG. 1a, the switch S4 is in conductive state during time intervals T1 to T4 (P=4) and in non conductive state at time interval T5 (N=5).

FIG. 11 is an example of an algorithm for determining which periodical pattern has to be selected for the boost converter composed of n bridge devices according to the present invention.

The present algorithm is executed by the device 20 comprising a boost converter composed of n bridge devices.

The present algorithm may be executed by the processor 200.

At step S1100, the processor 200 selects one first periodical pattern among available periodical patterns.

At step S1101, the processor 200 gets the input voltage Vin that the boost converter composed of n bridge devices has to boost. For example, Vin could be the result of a measurement made by digital converter 206 of the input voltage applied to the boost converter composed of n bridge devices. As other example, Vin could be determined by computation by processor 200 from yet other measurement made by digital converter 206 of other signals, such as bit voltages, output voltage, input or output currents, so as to realise a specific regulation function. In a special embodiment of the invention, the regulation function is determined so as to maximise the electrical power passing through the boost converter composed of n bridge devices.

At next step S1102, the processor 200 gets the desired range of output voltage in which the input voltage has to be boosted by the boost converter composed of n bridge devices. This range is composed of a first threshold $V_{min}$, which is the minimum voltage value, and of a second threshold $V_{max}$ which is the maximum voltage value. For example, the desired range of output voltage is known in advance as the acceptable input range of the load equipment that is connected to the output of the boost converter composed of n bridge devices.

At next step S1103, the processor 200 gets an expected output voltage $V_{out\_ref}$ to which the input voltage Vin has ideally to be boosted, using the currently selected periodical pattern, by the boost converter composed of n bridge devices within the desired range. For example, the expected output voltage $V_{out\_ref}$ is equal to $V_{max}$. In another example, Vout is equal $(V_{max}+V_{min})/2$.

At next step S1104, the processor 200 checks if a periodical pattern needs to be selected.

For that, the processor 200 determines the output voltage Vout=Vin/(1−D) where Vin is the input voltage obtained at step S1101 and D is the duty cycle of $1^{st}$ pattern determined at steps S1100 or S1108. Then processor 200 checks if the output voltage Vout is lower than the first threshold $V_{min}$, or higher than the second threshold $V_{max}$.

If the determined output voltage is lower than the first threshold or higher than the second threshold, the processor 200 moves to step S1105. Otherwise, the processor 200 moves to step S1109.

At next step S1105, the processor 200 checks for each duty cycle D stored in the ROM memory 202, the corresponding boosted voltage value $V_{boost}$=Vin/(1−D) and selects among the duty cycles stored in the ROM memory 202, at least one duty cycle for which the boosted voltage value $V_{boost}$ is close to the expected output voltage $V_{out\_ref}$ and within the desired range of output voltage comprised between the first and second thresholds $V_{min}$ and $V_{max}$.

At the same step, the processor 200 checks if one of the duty cycle D selected at step S1105 corresponds to a one second periodical pattern, i.e. if one of the selected duty cycles D corresponds to a periodical pattern with same numbers $k_i$ as numbers $k_i$ of the first periodical pattern previously selected.

If one of the duty cycles D selected at step S1105 corresponds to a periodical pattern, the processor 200 moves to step S1107. Otherwise, the processor 200 moves to step S1106.

At step S1106, the processor 200 selects one third periodical pattern wherein in each time interval, the voltage between the input and the output of each ith bridge device with i from one to n, is equal to a null value, or an integer number $p_i$ times a at least one third positive value, or minus the number $p_i$ times the at least one third positive value, at least one number $k_i$ being different from the number $p_i$ of the previously selected periodical pattern.

The selected third periodical pattern corresponds to the duty cycle D for which the boosted voltage value $V_{boost}$ is the closest to the expected output voltage $V_{out\_ref}$ within the desired range of output voltage $[V_{min}\ V_{max}]$.

After that, the processor 200 moves to step S1108.

At step S1107, the processor 200 selects one second periodical pattern wherein in each time interval, the voltage between the input and the output of each ith bridge device with i from one to n, is equal to a null value, or an integer number $k_i$ times a at least one second positive value, or minus the number $k_i$ times the at least one second positive value.

The selected second periodical pattern corresponds to the duty cycle D for which the boosted voltage value $V_{boost}$ is the closest to the expected output voltage $V_{out\_ref}$ within the desired range of output voltage $[V_{min}\ V_{max}]$.

After that, the processor 200 moves to step S1108.

At step S1108, the processor 200 sets the second periodical pattern selected at step S1107 or the third periodical pattern selected at step S1108 as a first periodical pattern stored in memory 202.

At next step S1109, the processor 200 commands the switches of the RLBC 205 according to the first periodical pattern stored in memory 202.

In a variant, the processor 200 commands the switches of the RLBC 205 according to a periodical pattern that results from a permutation of columns of the periodical pattern shown in the corresponding Fig among the FIGS. 5 to 10 and stored in memory 202, which corresponds to the first periodical pattern.

After that, the processor 200 returns to step S1101.

For example, at step S1100, the processor 200 selects a first periodical pattern described by FIG. 9a, with $k_1$ equals two, $k_2$ equals three, $k_3$ equals four and gets at step S1101 an input voltage Vin=48 V.

At next step S1102, the processor 200 gets a first threshold $V_{min}$=197V and a second threshold $V_{max}$=247 V.

At next step S1103, the processor 200 gets an expected output voltage $V_{out\_ref}$=227V.

At next step S1104, the processor 200 checks if a periodical pattern needs to be selected. As D=0.8, the output voltage Vout=48/(1−0.8)=240 V is lower than the second threshold which is equal to 247Volts and higher than the first threshold which is equal to 197 Volts. As the output voltage value is not lower than the first threshold or higher than the second threshold, the processor 200 moves to step S1109.

At next step S1109, the processor 200 commands the switches of the RLBC 205 according to the periodical pattern indicated in the FIG. 9a and returns to step S1101.

At step S1101, the processor 200 gets an input voltage Vin=60 V.

At next step S1102, the processor 200 gets a first threshold $V_{min}$=197V and a second threshold $V_{max}$=247 V.

At next step S1103, the processor 200 gets a desired output voltage $V_{out}$=227V.

At next step S1104, the processor 200 checks if a periodical pattern needs to be selected. As D=0.8, the output voltage $V_{boost}$=60/(1−0.8)=300 V is higher than the second threshold which is equal to 247 Volts. As the output voltage value is higher than the second threshold the processor 200 moves to step S1105.

At next step S1105, the processor 200 checks for each duty cycle D stored in the ROM memory 202, the corresponding boosted voltage value $V_{boost}$=Vin/(1−D) and selects among the duty cycles stored in the ROM memory 202, at least one duty cycle for which the boosted voltage value $V_{boost}$ is close to the expected output voltage and within the desired range of output voltage comprised between the first and second thresholds.

For example, the processor selects the periodical pattern shown in FIG. 10a as D=0.75 as indicated in line 361 of the FIG. 3b, as its corresponding boosted voltage value=60/(1−

0.75)=240V is comprised between the first and second thresholds. Other duty cycles indicated in FIG. 3a have corresponding boost voltage which are not comprised between the first and second thresholds.

At the same step, the processor 200 checks if one of the selected duty cycle D corresponds to a one second periodical pattern, i.e. if one of the selected duty cycles D corresponds to a periodical pattern with same numbers $k_i$ as numbers $k_i$ of the first periodical pattern previously selected.

As the duty cycle D=0.75 does not correspond to a second periodical pattern, the processor 200 moves to step S1106, selects the periodical pattern shown in FIG. 10a and moves to step S1108.

At step S1108, the processor 200 sets the third periodical pattern selected at step S1108 as a first periodical pattern.

At next step S1109, the processor 200 commands the switches of the RLBC 205 according to the periodical pattern indicated in the FIG. 10a and returns to step S1101.

Naturally, many modifications can be made to the embodiments of the invention described above without departing from the scope of the present invention.

The invention claimed is:

1. Method for controlling an output voltage of a boost converter composed of n bridge devices connected in series, each bridge device being composed of plural switches and a capacitor, the method comprising:
   preparing at least three periodical patterns, each periodical pattern being decomposed in time intervals, wherein, in each time interval of the first and at least one second periodical patterns, the voltage between the input and the output of each ith bridge device, with i from one to n, is equal to
   a null value, or
   a product of an integer number $k_i$, as a first positive value that increases as i increases, and at least one second positive value, or
   a product of the number $k_i$, negative one, and at least one second positive value, and
   in each time interval of at least one third periodical pattern, the voltage between the input and the output of each ith bridge device with i from one to n, is equal to
   a null value, or
   a product of an integer number $p_i$ and at least one third positive value, or
   a product of the number $p_i$, negative one, and the at least one third positive value,
   wherein $p_i$ increases as i increases, and the at least one number $k_i$ is different from the number $p_i$ for each value of i;
   detecting that a periodical pattern has to be selected;
   selecting one periodical pattern from the at least three periodical patterns; and
   controlling the switches according to the selected periodical pattern.

2. Method according to claim 1, wherein the detection that a periodical pattern has to be selected is executed by checking if the first periodical pattern provides an output voltage value which is lower than a first threshold or higher than a second threshold.

3. Method according to claim 2, wherein the selected periodical pattern is one third periodical pattern if said third periodical pattern provides an output voltage value higher than the first threshold and lower than the second threshold and closer to an expected output voltage value than the output voltage provided by the or each second periodical pattern providing an output voltage higher than the first threshold and lower than the second threshold.

4. Method according to claim 3, wherein the selected periodical pattern is one second periodical pattern if said second periodical pattern provides an output voltage value higher than the first threshold, lower than the second threshold and at least as close to an expected output voltage value as the voltage or voltages provided by the at least one third periodical pattern.

5. Method according to claim 3, wherein the expected voltage value equals the second threshold.

6. Method according to claim 1, wherein the sum of the voltages between the input and the output of one bridge device over the number of time intervals of each periodical pattern equals a null value.

7. Method according to claim 1, wherein a first bridge device is connected to one of the terminals of an electric power source boosted by the boost converter composed of n bridge devices and one of the switches of the last bridge device is connected to the other terminal of the electric power source boosted by the boost converter composed of n bridge devices or the first bridge device is connected to one of the terminals of the electric power source boosted by the boost converter composed of n bridge devices and the boost converter composed of n bridge devices further comprises at least a switch which is connected to the last bridge device and to the other terminal of the electric power source boosted by the boost converter composed of n bridge devices.

8. Method according to claim 7, wherein for any time interval in a first subset of time intervals of the selected periodical pattern, the switch which is connected to the other terminal of the electric power source boosted by the boost converter composed of n bridge devices is conducting during the time intervals of the first subset and the sum of the voltages between the input and the output of the bridge devices during the time intervals of the first subset equals an integer number Kp times a positive value.

9. Method according to claim 8, wherein for any time interval in a second subset of time intervals of one periodical pattern, the switch which is connected to the other terminal of the electric power source boosted by the boost converter composed of n bridge devices is not conducting during the time intervals of the second subset and the sum of the voltages between the input and the output of the bridge devices during the time intervals of the second subset equals minus a non null integer number P times the first positive value.

10. Method according to claim 9, wherein the first subset of time intervals comprises Kp time intervals, the second subset comprises P time intervals and the number Kp equals the number of time intervals of the periodical pattern minus number P.

11. Method according to claim 10, wherein the input of the boost converter composed of n bridge devices is connected to the electric power source and a voltage provided by the selected one periodical pattern equals the voltage of the electric power source times a number of time intervals N of the selected periodical pattern divided by the number of time intervals N minus a number P that is less than the number of time intervals N.

12. Method according to claim 1, wherein each of the first, second and third positive values equals a voltage of the electric power source divided by the number of time intervals N minus the number P of respectively each first, second and third periodical pattern.

13. Method according to claim 1, wherein the boost converter is composed of three bridge devices, $k_1$ equals two, $k_2$ equals three, $k_3$ equals four, $p_1$ equals one, $p_2$ equals two and $p_3$ equals four.

14. Method according to claim 1, wherein a number of time intervals is an integer number from five to ten, inclusive.

15. Apparatus for controlling an output voltage of a boost converter comprising:

- n bridge devices connected in series, each bridge device being composed of plural switches and a capacitor;
- a controller to control the switches by one first periodical pattern out of at least three periodical patterns, each periodical pattern being decomposed in time intervals, wherein, in each time interval of the first and at least one second periodical patterns, the voltage between the input and the output of each ith bridge device with i from one to n, is equal to
- a null value, or
- a product of an integer number $k_i$, as a first positive value that increases as i increases, and at least one second positive value, or
- a product of the number $k_i$, negative one, and at least one second positive value, and
- in each time interval of at least one third periodical pattern, the voltage between the input and the output of each ith bridge device with i from one to n, is equal to
- a null value, or
- a product of an integer number $p_i$ and at least one third positive value, or
- a product of the number $p_i$, negative one, and the at least one third positive value,
- wherein $p_i$ increases as i increases, and the at least one number $k_i$ is different from the number $p_i$ for each value of i; and the controller is further configured to detect that a periodical pattern has to be selected, select one periodical pattern, and control the switches according to the selected periodical pattern.

* * * * *